Feb. 11, 1958 R. H. RINES 2,823,365
ELECTRO-ACOUSTIC SYSTEM AND METHOD
Original Filed July 18, 1945
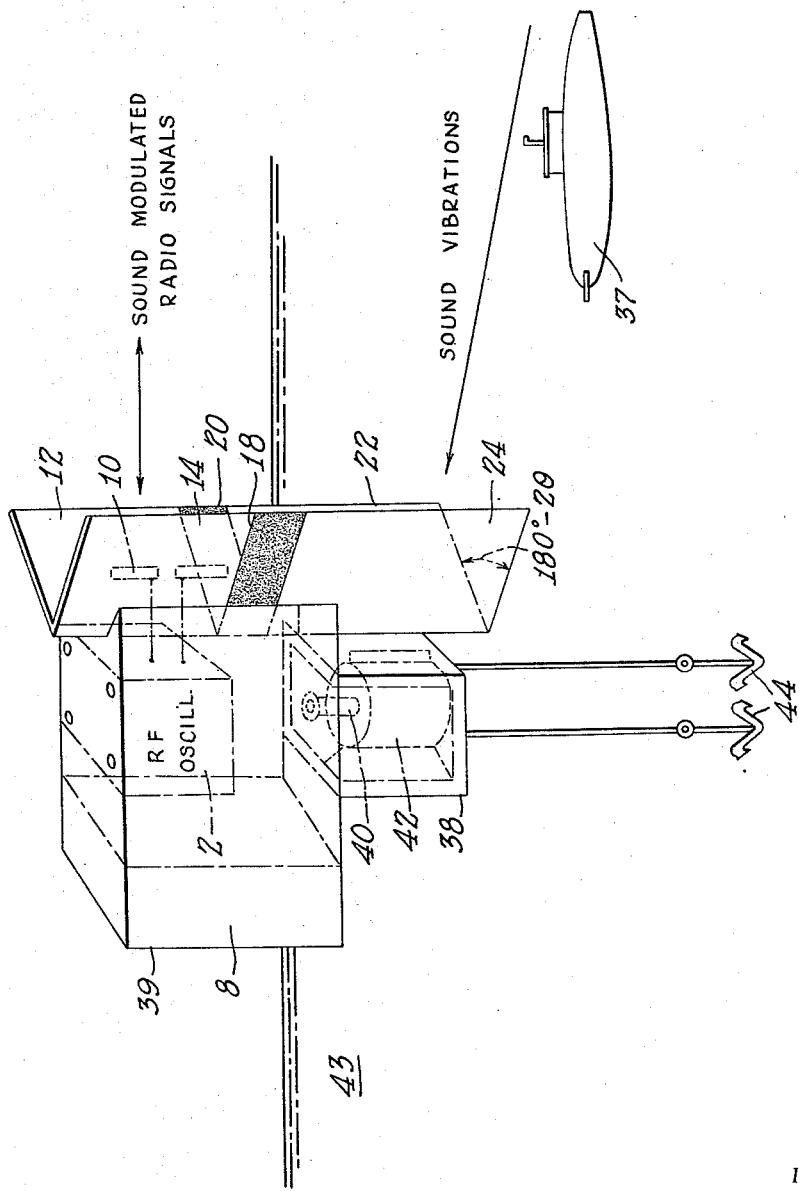
INVENTOR
Robert H. Rines
BY Rines and Rines
ATTORNEYS

United States Patent Office 2,823,365
Patented Feb. 11, 1958

2,823,365

ELECTRO-ACOUSTIC SYSTEM AND METHOD

Robert Harvey Rines, Newton, Mass.

Original application July 18, 1945, Serial No. 605,722, now Patent No. 2,539,593, dated January 30, 1951. Divided and this application January 22, 1951, Serial No. 207,200

21 Claims. (Cl. 340—6)

The present invention relates to the transmission and reception of intelligence, using both sound and electromagnetic energy as the agencies of communication, and more particularly to means employing the directive discrimination of sound beams. The term "sound" will be employed hereinafter, in the specification and the claims, to include the ultrasonic, as well as the audible, part of the sound spectrum, and to include also all kinds of elastic vibrations. The invention, indeed, finds particular application to high-frequency sonic or ultrasonic communication or detection. The present application is a division of copending parent application, Serial No. 605,722, filed July 18, 1945, now Patent 2,539,593, for Electro-Acoustic System.

An object of the invention is to provide a new and improved combined-sound-and-electromagnetic system and method for communication and detection.

A further object is to provide a novel buoy for communicating intelligence or signals detected under the water from a source of sound vibration by means of electromagnetic energy.

Still another object of the invention is to provide a new and improved system for submarine detection.

An additional object is to provide a novel corner reflector system adapted to modulate radio waves reflected therefrom in accordance with acoustic vibrations impinged upon the system.

Other and further objects will be explained hereinafter and will be particularly pointed out in the appended claims.

The invention will now be more fully explained in connection with the accompanying drawing, the single figure of which is a diagrammatic view of circuits and apparatus embodying the invention in preferred form.

As explained in the said parent application, and in U. S. Letters Patent 2,063,944, issued December 15, 1936, to George W. Pierce, a transversely vibratory conducting element, such as a diaphragm, when disposed in a sound-conducting medium at an angle to a beam of sound waves, may be set into transverse harmonic, as well as fundamental, modes of vibration. With the diaphragm oriented at the Pierce angle $\theta$, the sound beam in the medium strikes all vibratory regions in the diaphragm in the proper phase to enhance the vibration, producing spacial resonance between the diaphragm and the vibrations in the medium. As the diaphragm thus occupies a given angle corresponding to resonant response to the sound beam, it is possible to determine the direction of the sound beam, and as departure from the angle associated with resonance carries with it nonresonance, it is possible to obtain a very sharp determination of direction of the sound beam.

The diaphragm or other vibratory element may, as explained in the said parent application, and in said Letters Patent, be used either for transmitting a sound beam directionally in a predetermined direction or for receiving a sound beam from a predetermnied direction. If the diaphragm is oriented at the Pierce angle $\theta$ with respect to the plane wave front of, for example, received sound waves, the following relation obtains:

$$\sin \theta = \frac{V_0}{V}$$

where $V$ is the velocity, at the critical frequency, of the propagation of the transverse mechanical sound-wave vibration in the diaphragm, and $V_0$ is the corresponding velocity of propagation in the medium, which may be water. The transverse vibration propagated along the diaphragm will then have a velocity component, in the direction of the sound beam, substantially equal to the velocity of the sound beam in the medium.

As shown in the drawing, the vibratory element may comprise a first pair of diverging plates, wings or plane diaphragm surfaces 22 and 24, rigidly connected together into a single mechanical unit. As illustrated, for example, in Fig. 13 of the said Letters Patent 2,063,944, these two plates may be in the form of a dihedral angle 180 degrees minus $2\theta$, so as to provide a single forward-directed multi-diaphragm unit, driven by the sound waves received from an object such as an under-water submarine 37. The plates or wings 22 and 24 are shown as rigid continuations of a second pair of diverging conducting plates, wings or plane diaphragm surfaces, 12 and 14, respectively, though they may, if desired, be electromagnetically insulated from these plates 12 and 14 as shown at 18 and 20. The insulators 18 and 20, however, are capable of conducting elastic vibrations from the diaphragm plates 22 and 24 into the respective diaphragm plates 12 and 14.

The conducting surfaces 12 and 14 constitute an electromagnetic-wave corner reflector, and they are positioned in the air above the surface of the water 43 to permit their use with radio waves. The plates 22 and 24 may be submerged below the surface 43 of the water, as before stated, in order that they may serve, for example, as detectors of sound vibration emitted by or reflected and scattered from the submarine 37. The system 22—24, 12—14, is shown supported by a buoy hereinafter described.

In the angle between the surfaces 12 and 14 of the corner reflector, there is shown positioned a radio antenna 10, illustrated as a dipole that may be excited from a radio-frequency oscillator 2 supported in a sealed container 8 forming the upper portion of the buoy. This system may be balanced in the water by a weight 39 about a vertically disposed shaft 40, driven by a self-powered motor 42 disposed in a sealed box 38 connected with the box 8. The buoy may be held in place in the water by anchors 44.

As disclosed in the said parent application, when a conducting element adapted to support radio-frequency energy is transversely vibrated, as in response to elastic vibrations of predetermined frequency to which the conducting means is preferably of sufficient dimensions to respond by producing mechanical resonance, the radio-frequency energy transmitted or received by the conducting means will be found to be modulated by the elastic vibrations produced therein.

In the preferred system illustrated in the drawing, therefore, if the vibratory plates or wings 22 and 24 are of sufficient dimension to respond mechanically to strong frequency components emitted from or otherwise emanating from the submarine 37, when the plates 22 and 24 are disposed to face the submarine or other source of sound waves, such that the bisector of the angle between the plates 22 and 24 is pointing in the direction of the source, the plates or wings 22, 24 will be set into transverse mechanical vibration. These vibrations will be transferred through the elements 18 and 20, if employed, to the wings 12 and 14 above the surface of the water 43. The dimensions of the plates or wings 12 and 14 are preferably also such that they, too, are thereupon set into transverse mechanical vibration. The frequency of the radio-frequency energy emitted by the dipole 10 and reflected from the plates 12 and 14 is adjusted such that the plates 12 and 14 have appropriate dimensions to give a satisfactory directional radio-beam property to the radio-frequency energy.

In the case illustrated, radio waves are emitted from the antenna system 10, 12, 14, and beamed directionally into space. The antenna 10 is preferably positioned along the bisector of the dihedral angle, and at a distance from the vertex axis of the plates 12, 14 approximately equal to a quarter of the radio-frequency wave-length employed. These radio waves will be modulated, as before stated, in accordance with the transverse mechanical resonant vibration of the plates 22—24 and 12—14 at the time that the system 22—24, 12—14 is pointing directly at the source of the underwater sound vibration, such as the submarine 37. A radio-receiving station (not shown) in the air oriented along this direction, would then receive the radio signals carrying this modulation and would then be informed of the presence and the direction of the submarine 37. Inasmuch as the degree of modulation produced is dependent upon the amount of vibration set up in these plates, an indication may be had of the approximate range of the submarine 37 from the buoy by the degree of modulation received at the radio-receiving station.

The complete diaphragm unit 22—24, 12—14 may be continuously rotated about the vertically disposed shaft 40 by the motor 42, periodically to receive sound vibrations from submarines or other sources in all directions of azimuth, and simultaneously to transmit through the air, along the corresponding directions, a radio beam modulated by the received sound waves. If desired, the plates 12, 14 may be twisted at an angle with respect to the plates 22, 24, thereby to effect transmission of the radio beam along a different direction from the reception of the sound beams. The modulated radio signals may be received, as before stated, at suitably located receiving stations (not shown) on shore, in the air, or on the sea, as on light ships.

This system is useful even without the antenna 10 and its exciting mechanism 2. Radio pulses or other radio energy may be transmitted from, for example, an aircraft radar or any other transmitting station, to the corner reflector 12, 14, so as to be reflected therefrom. The aircraft or other station would then receive the reflected waves as modulated by the sound waves coming from the submarine at the time the system points in the direction of the submarine. In this manner a completely passive system is provided.

By using radio-frequency oscillators 2 of different frequencies with different buoys, moreover, it is possible to determine which buoy is issuing a particular modulated signal. This may be desired where the buoys are to maintain fixed orientations and are not to be rotated to scan in azimuth.

As disclosed in the said parent application, systems of this character may be used also completely in air. Where the system of the present invention is utilized completely in air, as to detect acoustic vibrations in the air and to modulate the reflected radio waves in accordance therewith, both the pair of elements 12—14 and the pair of elements 22—24 act not only as acoustic devices but also as radio-wave corner reflectors. Periodic rotation of such reflectors would, of course, indicate the directions in which acoustic vibrations were received, as before discussed.

While the system illustrated and described has been thus far discussed in connection with receiving sound vibrations, such as under-water vibrations, as further explained in the said parent application, and in the said Letters Patent, the diaphragms 22, 24 may, if desired, be driven as by magnetostrictive cores (not shown) directionally to transmit sound beams into the water. The radio waves reflected from the upper wings 12, 14 will then also, of course, be modulated by the elastic vibrations set up therein as a result of the vibration of the wings 22, 24.

It is to be understood, moreover, that while radio-wave reflecting surfaces in the form of the dihedral or corner reflectors and sound vibration-responsive dihedral-angle surfaces 22, 24 have been illustrated, other configurations are also possible. As disclosed in the said parent application, plane reflecting surfaces may, as another illustration, be utilized, or surfaces having any desired curvature may similarly be employed. Instead of these surfaces taking the form of planar sheets or plates, moreover, as explained in the said parent application, they may, if desired, assume the form of thin strips or rods or any other configuration. In the latter case, they may, indeed, be omni-directionally responsive to both or either of the sound waves and the radio waves. In all cases, however, one vibratory portion of the system is to be inserted into the water 43 or other medium in which the sound waves are to be transmitted or received. Another portion which may include or even be the same as the said one portion where the medium is air, is utilized for the propagation of radio waves either by direct excitation from a radio-frequency generator or by reflected radio-frequency energy, the radio waves being modulated in accordance with the vibrations.

Further modifications will occur to persons skilled in the art, and all such are considered to fall within the spirit and scope of the invention as defined in the appended claims.

What is claimed is:

1. Apparatus of the character described that comprises means for directionally receiving sound waves under water, means for transmitting radio signals responsive to the received sound waves, means for confining the transmission of the radio signals along substantially one direction only having a fixed relation to the direction from which the sound waves are received, and means for periodically changing the direction of reception of the sound waves.

2. Apparatus for indicating the presence of submarines that comprises means for directionally receiving sound waves under water from the submarine, means for directionally transmitting radio signals modulated by the received sound waves, and means for confining the directional transmission of the radio signals along a direction having a fixed relation to the direction from which the sound waves are received.

3. An electro-acoustic system having a directional acoustic receiver adapted to be positioned below the surface of the water to receive sound waves below the surface of the water, means for transmitting electromagnetic waves through the air modulated by the received sound waves, and means for confining the transmission of the electromagnetic waves to substantially one direction only having a fixed relation to the direction of reception of the sound waves.

4. An electro-acoustic system having radio-wave conducting means disposed in a first medium for transmitting radio waves, an acoustic receiver disposed in a second medium adapted to vibrate in response to sound waves impinging upon it, and means mechanically connecting the acoustic receiver to the radio-wave conducting means to cause the vibrations of the acoustic receiver to vibrate the radio-wave conducting means in order to modulate the radio waves transmitted by the radio-wave conducting means.

5. An electro-acoustic system having radio-wave conducting means for transmitting radio waves, an acoustic receiver adapted to vibrate in response to sound waves impinging upon it, the acoustic receiver being adapted to be positioned below the surface of the water to receive sound waves from an object below the surface of the water, and means connecting the acoustic receiver to the antenna to carry the vibrations of the acoustic receiver to the radio-wave conducting means in order to vibrate the radio-wave conducting means thereby to modulate the radio waves transmitted by the radio-wave conducting means.

6. An electro-acoustic system having, in combination, a buoy for floating upon the surface of a body of water, a first conducting means supported by the buoy below the surface of the water, the first conducting means being mechanically vibratory in response to sound vibrations directed thereupon, a second conducting means supported by the buoy above the surface of the water to transmit radio waves above the surface of the water, and means mechanically connecting the first and second conducting means for transmitting mechanical vibrations of the first conducting means produced in response to the directing of sound waves thereupon to the second conducting means, thereby mechanically to vibrate the second conducting means in order to modulate the radio waves transmitted by the second conducting means in accordance with the sound vibrations of the first conducting means.

7. An electro-acoustic system of the character described in claim 6 and in which the first conducting means comprises means for directionally receiving sound vibrations.

8. An electro-acoustic system of the character described in claim 6 and in which the second conducting means directionally transmits radio waves.

9. An electro-acoustic system of the character described in claim 6 and in which the first conducting means comprises means for directionally receiving sound vibrations and the second conducting means directionally transmits radio waves.

10. An electro-acoustic system of the character described in claim 6 and in which the first conducting means comprises a dihedral-angle diaphragm system.

11. An electro-acoustic system of the character described in claim 6 and in which the second conducting means comprises a directional reflecting system.

12. An electro-acoustic system of the character described in claim 6 and in which the second conducting means comprises a corner reflector.

13. An electro-acoustic system of the character described in claim 6 and in which the first conducting means is provided with a planar surface.

14. An electro-acoustic system having, in combination, a plurality of electromagnetic wave reflectors forming diverging reflecting surfaces for directionally transmitting electromagnetic waves, the surfaces being vibratory in response to acoustic vibrations, and means for periodically rotating the reflectors as a unit.

15. An electro-acoustic system having an electromagnetic wave reflector provided with a pair of diverging reflecting surfaces for directionally transmitting electromagnetic waves, a surface of the reflector being transversely vibratory in response to acoustic vibrations in order to modulate the transmitted electromagnetic waves in accordance with the acoustic vibrations, vibratory means for directionally receiving sound waves and causing the said reflector surface to vibrate acoustically in unison therewith in response to the received sound waves, and means for rotating the reflector to transmit the modulated electromagnetic waves along predetermined directions.

16. An electro-acoustic system having, in combination, an electromagnetic-wave reflector provided with a pair of diverging reflecting surfaces for directionally transmitting electromagnetic waves, vibratory means for receiving sound waves and causing transverse vibration of the reflector to propagate elastic vibrations therealong in unison with the vibration of the vibratory means in order to modulate the transmitted electromagnetic waves in response to the vibrations.

17. An electro-acoustic system having, in combination, an electromagnetic-wave reflector provided with a pair of diverging reflecting surfaces for directionally transmitting electromagnetic waves, and vibratory means for receiving sound waves and causing transverse vibration of the reflector surfaces to propagate elastic vibrations therealong in unison with the vibration of the vibratory means in order to modulate the transmitted electromagnetic waves in response to the vibrations.

18. An electro-acoustic system having, in combination, an electromagnetic-wave corner reflector provided with a pair of diverging reflecting surfaces for directionally transmitting electromagnetic waves impinging from a remote source of electromagnetic waves upon the reflecting surfaces, a portion of the reflector being transversely vibratory in response to acoustic vibrations in the medium surrounding the said portion to vibrate the reflector in unison with the vibration of the said portion in order to modulate the transmitted electromagnetic waves in accordance with the acoustic vibrations.

19. An electro-acoustic system of the character described in claim 16 and in which the said reflector surfaces are each angularly disposable at an angle to the direction of the said sound waves such that the said elastic vibrations propagated along the reflector surfaces shall have a velocity component, in the said direction, substantially equal to the velocity of the sound waves as they are received.

20. An electro-acoustic system of the character described in claim 18 and in which the said portion of the reflector comprises one of the said reflector surfaces.

21. An electro-acoustic system having, in combination, a radio wave reflector provided with a pair of diverging radio wave reflecting surfaces of dimensions appropriate for directionally transmitting radio waves impinging from a radio-wave source upon the reflecting surfaces, at least a portion of the reflector being transversely vibratory in response to sound vibrations in the medium surrounding the said portion to vibrate the reflector in unison with the vibration of the said portion in order to modulate the transmitted radio waves in accordance with the sound vibrations.

References Cited in the file of this patent

UNITED STATES PATENTS

| 2,063,944 | Pierce | Dec. 15, 1936 |
| 2,431,018 | Bailey | Nov. 18, 1947 |
| 2,432,984 | Budenbom | Dec. 23, 1947 |
| 2,448,787 | Ferrel | Sept. 7, 1948 |
| 2,461,005 | Southworth | Feb. 8, 1949 |

FOREIGN PATENTS

| 405,613 | Great Britain | Jan. 26, 1934 |
| 596,439 | Germany | May 3, 1934 |